US009684302B2

(12) United States Patent
Kiuchi et al.

(10) Patent No.: US 9,684,302 B2
(45) Date of Patent: Jun. 20, 2017

(54) CONTROL DEVICE AND NUCLEAR POWER PLANT CONTROL SYSTEM

(75) Inventors: Shinji Kiuchi, Tokyo (JP); Hironobu Shinohara, Tokyo (JP); Yasutake Akizuki, Tokyo (JP); Toshiki Fukui, Tokyo (JP); Hiroshi Shirasawa, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 728 days.

(21) Appl. No.: 13/876,798

(22) PCT Filed: Sep. 29, 2011

(86) PCT No.: PCT/JP2011/072314
§ 371 (c)(1),
(2), (4) Date: Mar. 28, 2013

(87) PCT Pub. No.: WO2012/046609
PCT Pub. Date: Apr. 12, 2012

(65) Prior Publication Data
US 2013/0204405 A1    Aug. 8, 2013

(30) Foreign Application Priority Data

Oct. 4, 2010 (JP) ................................. 2010-225273

(51) Int. Cl.
*G05B 9/02* (2006.01)
*G06F 19/00* (2011.01)
(Continued)

(52) U.S. Cl.
CPC .......... *G05B 23/02* (2013.01); *G06F 11/1695* (2013.01); *G06F 11/185* (2013.01);
(Continued)

(58) Field of Classification Search
CPC ...................................................... G06F 13/28
(Continued)

(56) References Cited

U.S. PATENT DOCUMENTS 4,977,529 A * 12/1990 Gregg ...................... G09B 9/00
376/245
5,270,917 A * 12/1993 Kimura ............... G06F 11/2017
700/82
(Continued)

FOREIGN PATENT DOCUMENTS

CN    101968974 A *    2/2011
EP    0 472 169 A2    2/1992
(Continued)

OTHER PUBLICATIONS

Written Opinion of PCT/JP2011/072314 mailed Nov. 15, 2011.
(Continued)

*Primary Examiner* — Mohammad Ali
*Assistant Examiner* — Md Azad
(74) *Attorney, Agent, or Firm* — Westerman, Hattori, Daniels & Adrian, LLP

(57) ABSTRACT

A nuclear power plant control system including: a detection unit for detecting a specific event occurring in the nuclear power plant; an on-site equipment handling the event; and a majority decision judging device and an on-site equipment control device which constitute a plurality of control devices respectively operating independently. Each of the control devices includes a plurality of arithmetic units which perform arithmetic processes independently and in parallel based on a detection result of the detection unit, and output a signal for controlling the on-site equipment according to the results of operations of the arithmetic processes. The plurality of arithmetic units perform a matching process for harmonizing process statuses of the arithmetic processes of (Continued)

respective arithmetic units with each other when starting up the control devices, and after completing the matching process, respectively perform the arithmetic processes independently and in parallel.

6 Claims, 6 Drawing Sheets

(51) Int. Cl.
| | | |
|---|---|---|
| *G21C 7/00* | (2006.01) | |
| *G06F 11/00* | (2006.01) | |
| *G05B 23/02* | (2006.01) | |
| *G06F 11/18* | (2006.01) | |
| *G06F 11/20* | (2006.01) | |
| *G21D 3/00* | (2006.01) | |
| *G21D 3/04* | (2006.01) | |
| *G06F 11/16* | (2006.01) | |

(52) U.S. Cl.
CPC ......... *G06F 11/2038* (2013.01); *G21D 3/001* (2013.01); *G21D 3/04* (2013.01); *G06F 11/1633* (2013.01); *G06F 11/1658* (2013.01); *Y02E 30/40* (2013.01)

(58) Field of Classification Search
USPC ........ 700/292, 184, 82, 79; 714/11, 43, 732; 710/22; 376/217, 215, 259, 242, 254; 703/18
See application file for complete search history.

(56) References Cited

U.S. PATENT DOCUMENTS

| | | | |
|---|---|---|---|
| 5,621,776 A * | 4/1997 | Gaubatz | ................. G21C 17/00 376/215 |
| 2004/0078101 A1 | 4/2004 | Kondoh et al. | |
| 2004/0136487 A1* | 7/2004 | Shin | ......................... G21D 3/04 376/259 |
| 2006/0236158 A1 | 10/2006 | Thayer | |
| 2008/0016404 A1* | 1/2008 | Ishikawa | ............ G05B 23/0229 714/43 |

FOREIGN PATENT DOCUMENTS

| | | |
|---|---|---|
| EP | 1 667 024 A2 | 6/2006 |
| JP | 05-136767 A | 6/1993 |
| JP | 2003-287587 A | 10/2003 |
| JP | 2005-227873 A | 8/2005 |
| JP | 2010-205261 A | 9/2009 |
| JP | 2010-160712 A | 7/2010 |
| WO | 2009/060953 A1 | 5/2009 |

OTHER PUBLICATIONS

International Search Report of PCT/JP2011/072314, Mailng Date of Nov. 15, 2011.
Extended (Supplementary) European Search Report dated Dec. 19, 2016, issued in counterpart European Patent Application No. 11830542.4. (7 pages).

* cited by examiner

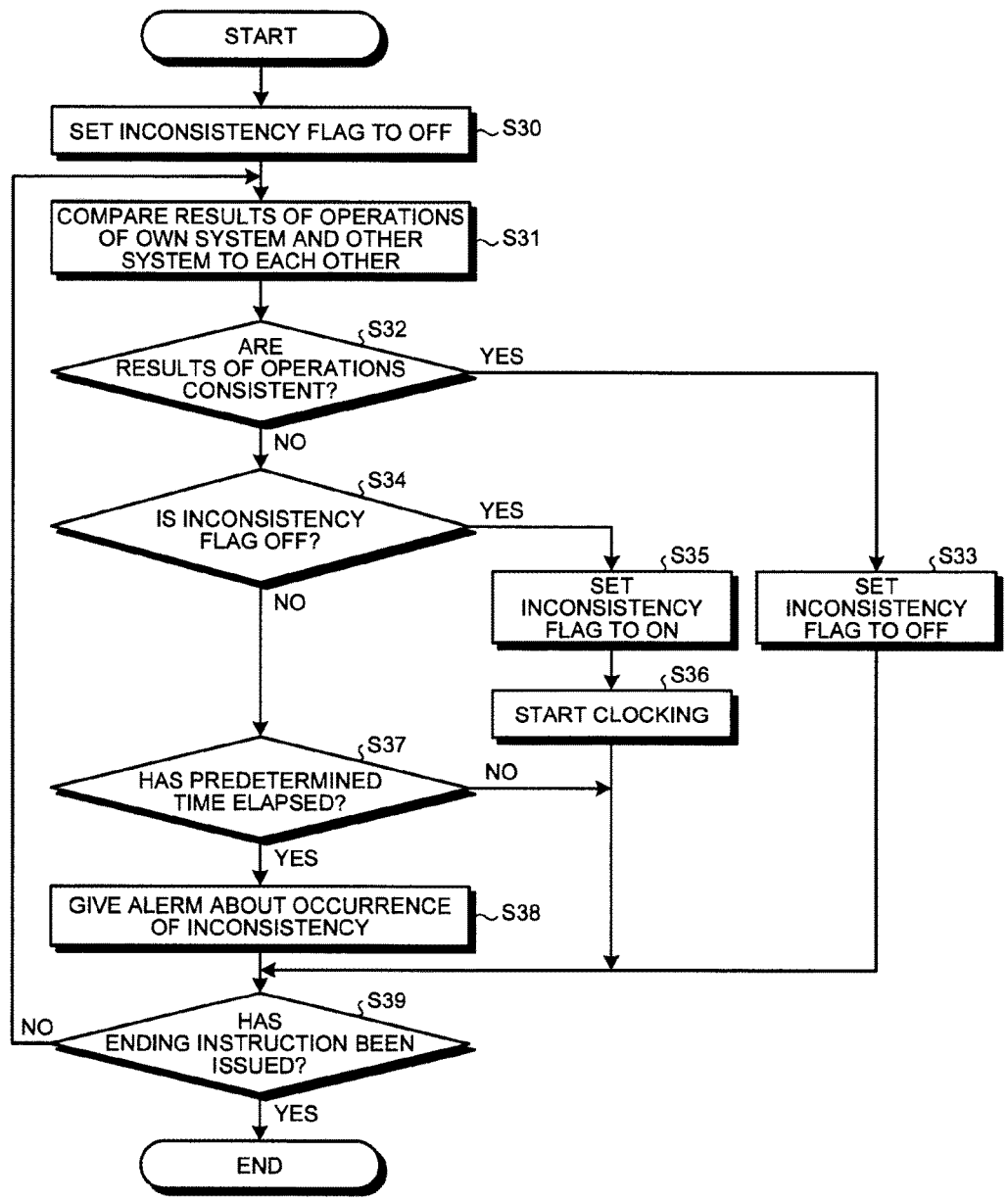

CONTROL DEVICE AND NUCLEAR POWER PLANT CONTROL SYSTEM

FIELD

The present invention relates to a control device and a nuclear power plant control system, and in particular, a control device and a nuclear power plant control system which have high reliability.

BACKGROUND

Advanced safety is required for a nuclear power plant, and therefore, in addition to a control system for controlling a normal operation of the plant, another control system, which is called a safety protection system, is provided thereto. In order to ensure the safety of the plant, extremely high reliability is required for the safety protection system so that the operation of a reactor shutdown system and an engineered safety features can be automatically started.

In recent years, the safety protection system is configured by using a digital control device which is multifunctional and flexibly controllable. The digital control device to be used in the safety protection system has a stand-by redundant constitution which includes arithmetic units one of which constitutes a currently used system, and the other arithmetic unit constitutes a stand-by system in order to realize the high reliability (for example, refer to Patent Literature 1). Then, the arithmetic unit, which constitutes the stand-by system, performs a tracking by itself so that the data to be processed always corresponds to the data of the currently used system, thereby capable of immediately taking over the process from the arithmetic unit of the currently used system when an abnormal event has occurred in the currently used system (for example, refer to Patent Literature 2).

CITATION LIST

Patent Literature

Patent Literature 1: Japanese Laid-open Patent Publication No. 2003-287587
Patent Literature 2: Japanese Laid-open Patent Publication No. 05-136767

SUMMARY

Technical Problem

The stand-by redundant constitution requires a detection mechanism which detects an abnormal event, and a switching mechanism which switches the on-site system to the stand-by system and vice versa. Therefore, the reliability of the digital control device, which adopts the stand-by redundant constitution, is affected by the abnormal event detection rate of the detection mechanism, and the reliability of the switching mechanism. For the safety protection system which requires the extremely high reliability, the lowering of the reliability due to these influences is a serious problem.

The present invention has been made in view of the above-mentioned situations, and an object thereof is to provide a control device and a nuclear power plant control system which have high reliability.

Solution to Problem

According to an aspect of the present invention, a control device which is used in a safety protection system of a nuclear power plant includes a plurality of arithmetic units which respectively perform arithmetic processes independently and in parallel based on a detection result of a detection unit configured to detect a specific event occurring in the nuclear power plant, and output a signal for controlling a handling unit configured to handle the event according to results of operations of the arithmetic processes. The plurality of arithmetic units perform a matching process for harmonizing process statuses of the arithmetic processes of respective arithmetic units with each other when starting up the control device, and respectively perform the arithmetic processes independently and in parallel after completing the matching process.

In this control device, the plurality of arithmetic units perform the arithmetic processes independently and in parallel so that the high reliability thereof can be obtained.

Advantageously, in the control device, the plurality of arithmetic units compare the results of operations of the arithmetic processes of an own system and other system, and give an alarm when an inconsistency of the results of operations has continued over a predetermined period or more.

In this mode, an abnormal event of the arithmetic units can be detected while making the plurality of arithmetic units perform the arithmetic processes independently and in parallel, and therefore, the reliability of the control device can be enhanced.

Advantageously, in the control device, the plurality of arithmetic units perform the arithmetic processes per arithmetic cycles having predetermined lengths which are set so as to be shifted for respective arithmetic units.

In this mode, an influence from the other system can be avoided while making the plurality of arithmetic units perform the arithmetic processes independently and in parallel, and therefore, the reliability of the control device can be enhanced.

According to another aspect of the present invention, a nuclear power plant control system which controls a safety protection system of a nuclear power plant, includes: a detection unit which detects a specific event which occurs in the nuclear power plant; a handling unit which handles the event; a plurality of control devices which respectively operate independently. Each of the control devices includes a plurality of arithmetic units which perform arithmetic processes independently and in parallel based on a detection result of the detection unit, and output a signal for controlling the handling unit according to results of operations of the arithmetic processes, and the plurality of arithmetic units perform a matching process for harmonizing process statuses of the arithmetic processes of respective arithmetic units with each other when starting up the control device, and respectively perform the arithmetic processes independently and in parallel after completing the matching process.

This nuclear power plant control system includes multiplexed arithmetic devices, and further, the plurality of arithmetic units perform the arithmetic processes independently and in parallel in the respective arithmetic devices, and therefore, high reliability can be obtained.

Advantageous Effects of Invention

The control device and the nuclear power plant control system according to the present invention can produce an advantageous effect that high reliability thereof can be obtained.

BRIEF DESCRIPTION OF DRAWINGS

FIG. 6 is a flowchart illustrating a processing procedure of an abnormal event detection process.

DESCRIPTION OF EMBODIMENTS

Hereinafter, an embodiment of a control device and a nuclear power plant control system according to the present invention will be described in detail with reference to the drawings. Note that, this invention is not limited by this embodiment. Moreover, the components of this embodiment include things which a person skilled in the art can easily imagine, things which are substantially identical therewith, and things within a so-called equivalent range.

EXAMPLE

Figure 1:
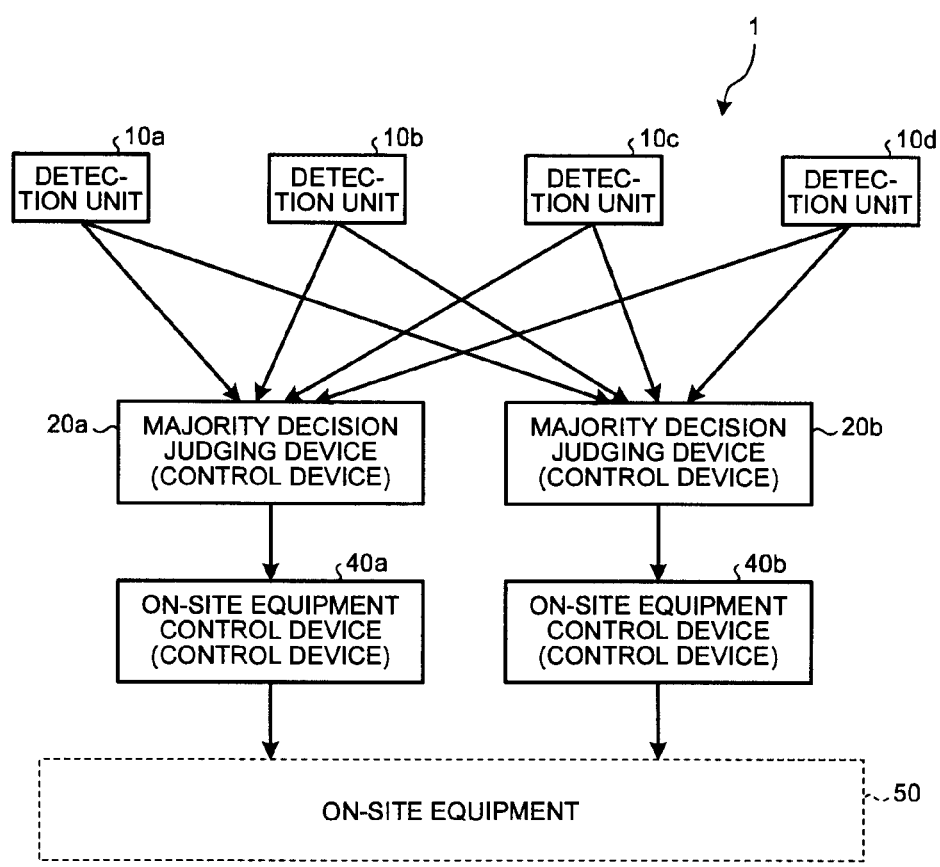
FIG. 1 is a diagram illustrating a schematic constitution of a nuclear power plant control system according to the present embodiment.

First, with reference to FIG. 1, the schematic constitution of the nuclear power plant control system according to the present embodiment will be described. FIG. 1 is a diagram illustrating the schematic constitution of the nuclear power plant control system according to the present embodiment. A nuclear power plant control system 1 illustrated in FIG. 1 is a control system which performs a control of a safety protection system of the nuclear power plant.

As illustrated in FIG. 1, the nuclear power plant control system 1 includes quadruplex detection units 10a to 10d, duplexed majority decision judging devices 20a and 20b, and duplexed on-site equipment control devices 40a and 40b.

The detection units 10a to 10d judge whether a specific event, which causes a trouble in an operation of the nuclear power plant, occurs, or not. Specifically, the detection units 10a to 10d judge whether the detected values of the on-site detectors, which are not illustrated, are values showing an abnormal event, or not, and when the detected values have been judged to be values showing the abnormal event, the detection units 10a to 10d send abnormal event detection signals to the majority decision judging devices 20a and 20b.

The majority decision judging devices 20a and 20b are control devices which perform a majority decision control logic (for example, 2/4 control logic). Specifically, the majority decision judging device 20a sends an abnormal event detection signal to the on-site equipment control device 40a when the abnormal event detection signals have been sent from a given number or more (for example, two or more) of the detection units 10a to 10d. The majority decision judging device 20b sends an abnormal event detection signal to the on-site equipment control device 40b when the abnormal event detection signals have been sent from a given number or more (for example, two or more) of the detection units 10a to 10d. The majority decision judging devices 20a and 20b respectively operate independently.

The on-site equipment control devices 40a and 40b are control devices which control an on-site equipment 50, such as a valve, a pump, and a circuit breaker. The on-site equipment control devices 40a and 40b judge whether some handling is required to be performed, or not, and when the performance of handling has been judged to be needed, the on-site equipment control devices 40a and 40b output control signals in order to instruct the performance of handling to the corresponding on-site equipment 50. The on-site equipment control devices 40a and 40b respectively operate independently.

Like this, in the nuclear power plant control system 1 according to the present embodiment, in order to avoid loss of functions caused by a single failure, the respective parts thereof are multiplexed, and the respective parts thereof operate independently.

Next, the schematic constitutions of the majority decision judging devices 20a and 20b will be described. Note that, because the majority decision judging devices 20a and 20b have the similar constitutions to each other, here, the majority decision judging device 20a will be described as an example with respect to the schematic constitutions of the devices.

Figure 2:
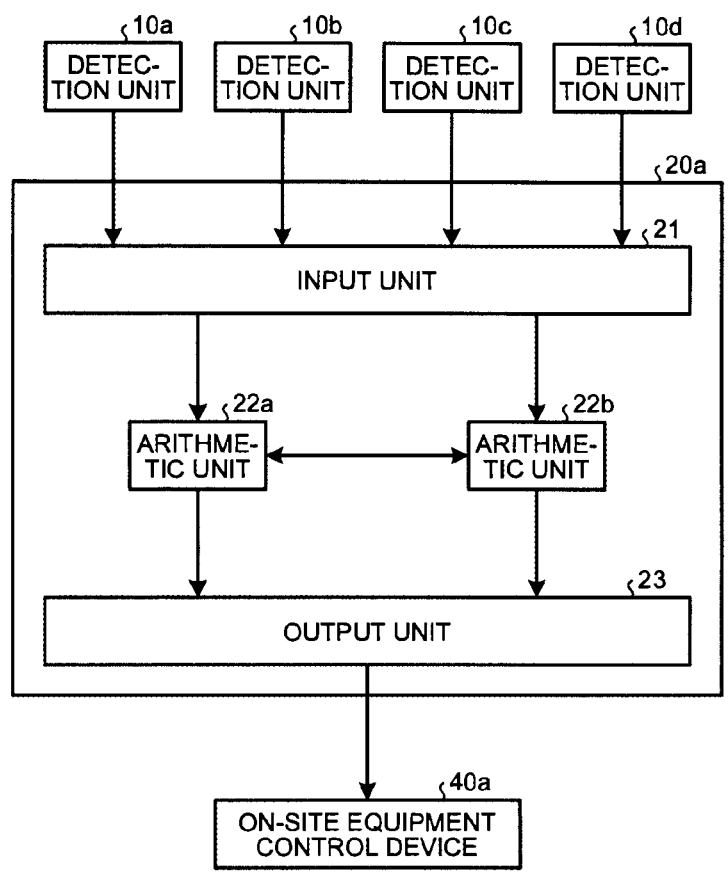
FIG. 2 is a block diagram illustrating a schematic constitution of a majority decision judging device.

FIG. 2 is a block diagram illustrating the schematic constitution of the majority decision judging device 20a. As illustrated in FIG. 2, the majority decision judging device 20a includes an input unit 21, arithmetic units 22a and 22b, and an output unit 23. The majority decision judging device 20a constitutes a parallel redundancy in which the arithmetic units 22a and 22b operate respectively in parallel.

The input unit 21 outputs the abnormal event detection signals, which have been received from the detection units 10a to 10d, to the arithmetic units 22a and 22b. The arithmetic units 22a and 22b are arithmetic units which perform various arithmetic processes. As one process of the various arithmetic processes, the arithmetic units 22a and 22b judge, based on a notification from the input unit 21, whether the abnormal event detection signals have been sent from a given number or more (for example, two or more) of the detection units 10a to 10d. Then, when the abnormal event detection signals have been sent from a given number or more of the detection units 10a to 10d, the arithmetic units 22a and 22b send the abnormal event detection signals via the output unit 23 to the on-site equipment control device 40a.

Next, the schematic constitutions of the on-site equipment control devices 40a and 40b will be described. Note that, because the on-site equipment control devices 40a and 40b have the similar constitutions to each other, here, the on-site equipment control device 40a will be described as an example with respect to the schematic constitutions of the devices.

Figure 3:
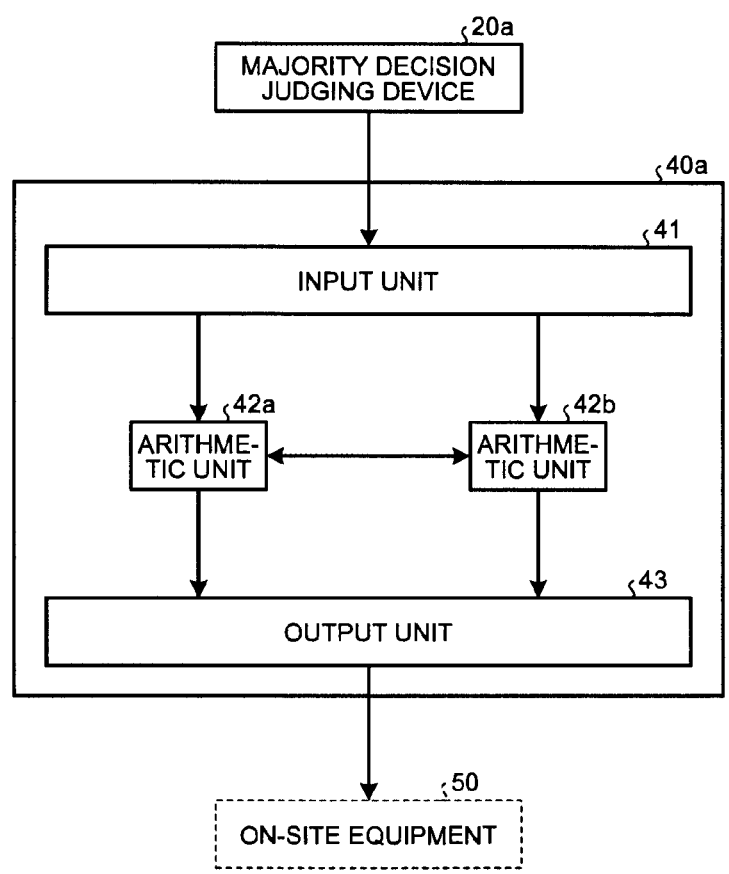
FIG. 3 is a block diagram illustrating a schematic constitution of an on-site equipment control device.

FIG. 3 is a block diagram illustrating the schematic constitution of the on-site equipment control device 40a. As illustrated in FIG. 3, the on-site equipment control device 40a includes an input unit 41, arithmetic units 42a and 42b, and an output unit 43. The on-site equipment control device 40a constitutes a parallel redundancy in which the arithmetic units 42a and 42b operate respectively in parallel.

The input unit 41 outputs the abnormal event detection signals, which have been received from the majority decision judging device 20a, to the arithmetic units 42a and 42b. The arithmetic units 42a and 42b are arithmetic units which perform various arithmetic processes. As one process of the various arithmetic processes, the arithmetic units 42a and 42b judge, based on the abnormal event detection signals which have been received from the on-site equipment control device 40a and the like, whether it is needed for the on-site equipment control device 40a to make the corresponding on-site equipment 50 perform a handling, or not. Then, when it is needed for the on-site equipment 50 to perform the handling, the arithmetic units 42a and 42b send, via the output unit 43, a control signal for making the on-site equipment 50 perform the handling.

Like this, in the nuclear power plant control system 1 according to the present embodiment, the majority decision judging devices 20a and 20b as the control devices, and the on-site equipment control devices 40a and 40b are made to be parallel and redundant in the inside thereof, and are configured in a way that the respective systems operate independently.

Namely, the majority decision judging devices 20a and 20b, and the on-site equipment control devices 40a and 40b do not need the mechanisms which are needed when adopting the stand-by redundant constitution, such as the detection mechanism which detects the abnormal event of the currently used system, and the switching mechanism which switches the currently used system to the stand-by system and vice versa, while the arithmetic units 22 in the insides thereof and the like are made redundant. Therefore, the majority decision judging devices 20a and 20b, and the on-site equipment control devices 40a and 40b are not affected by a lowering of the reliability due to these mechanisms, and therefore, high reliability can be realized.

Next, the operation at the time of staring of the majority decision judging devices 20a and 20b, and the on-site equipment control devices 40a and 40b, will be described with reference to FIG. 4. Note that, because the operation at the time of starting as a device, which adopts the parallel redundant constitution, is common between the majority decision judging devices 20a and 20b, and the on-site equipment control devices 40a and 40b, here, the majority decision judging device 20a will be described as an example with respect to the operation at the time of automation thereof.

Figure 4:
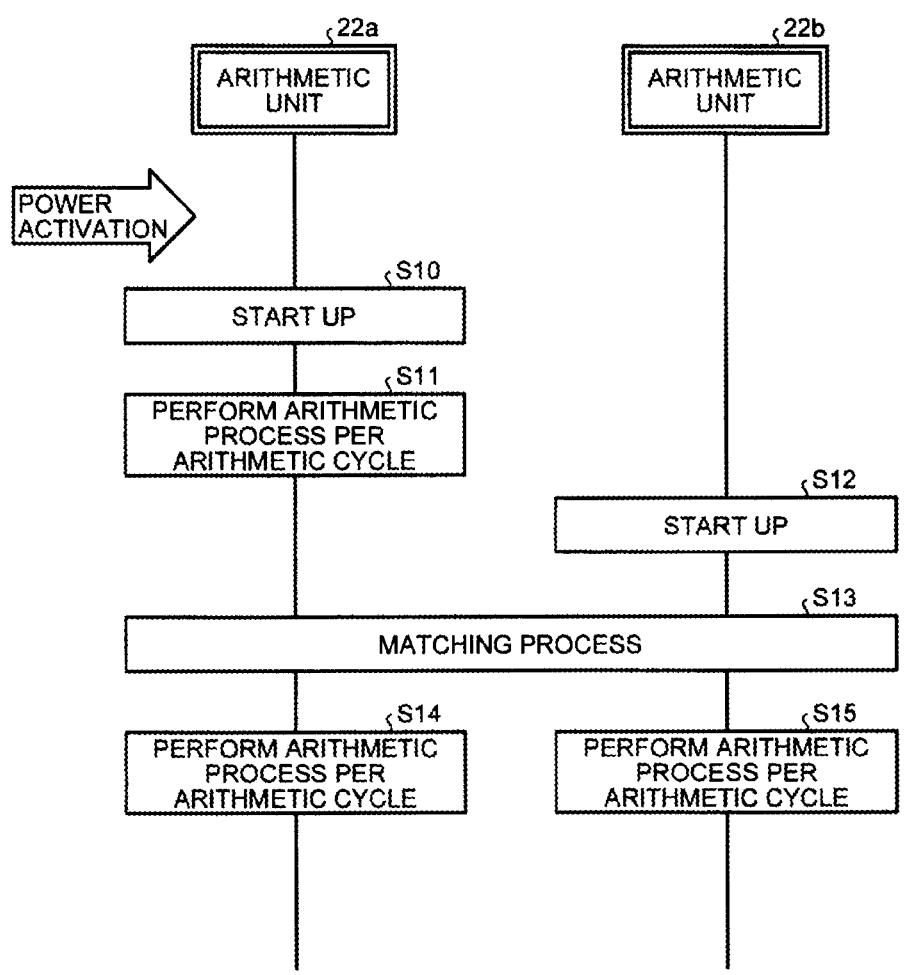
FIG. 4 is a sequence diagram illustrating an operation of the majority decision judging device at the time of starting.

FIG. 4 is a sequence diagram illustrating the operation of the majority decision judging device 20a at the time of starting. As illustrated in FIG. 4, when the power is activated, in the majority decision judging device 20a, as a step S10, one of the arithmetic units 22 (for example, the arithmetic unit 22a) is activated. The activated arithmetic unit 22 is made to perform, as a step S11, an arithmetic process per arithmetic cycle.

Thus, after the arithmetic process has been started at one of the arithmetic units 22, as a step S12, the other arithmetic unit 22 (for example, the arithmetic unit 22b) is activated. Here, the activation timing of the other arithmetic unit 22 is adjusted in a way that the arithmetic cycle of the other arithmetic unit 22 is shifted from the arithmetic cycle of the arithmetic unit 22 which has already started the arithmetic process.

Figure 5:
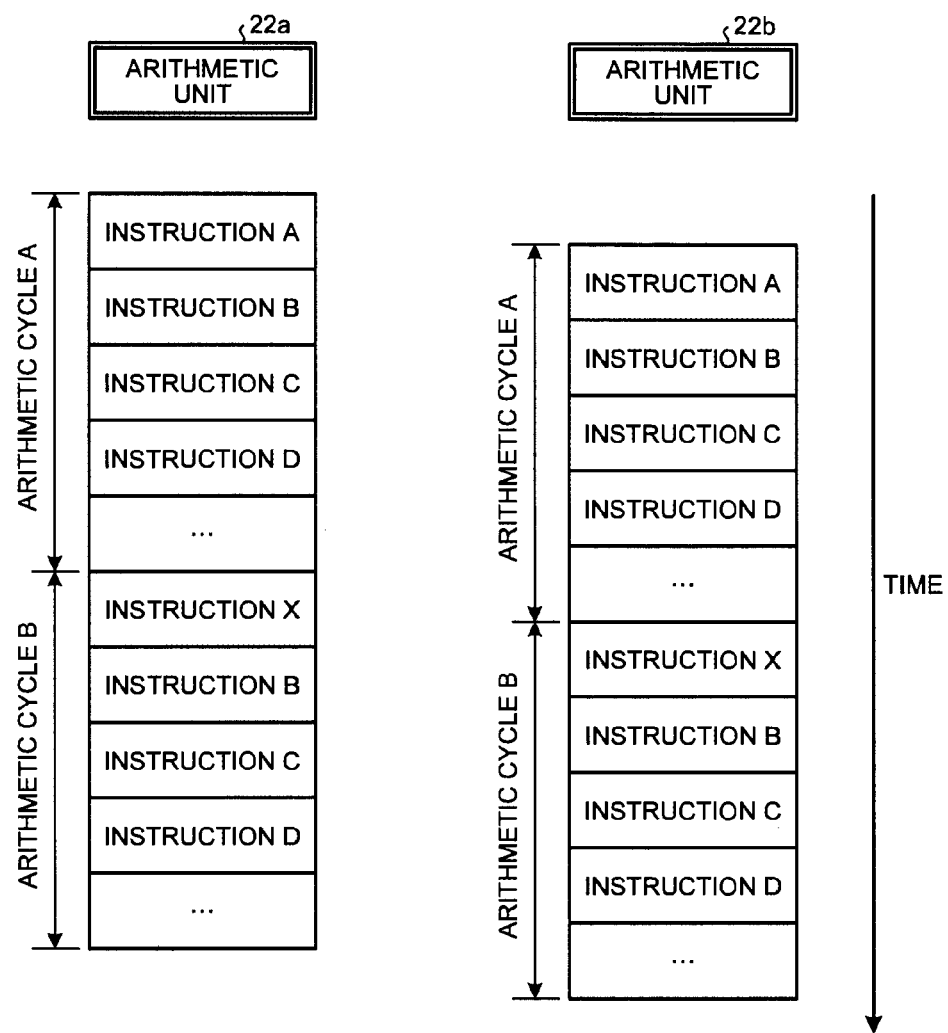
FIG. 5 is a diagram illustrating an example of a shift of an arithmetic cycle of an arithmetic unit.

The shift of the arithmetic cycle will be described with reference to FIG. 5. FIG. 5 illustrates an example of the shift of the arithmetic cycle between the first system and the second system. As illustrated in the example of FIG. 5, the arithmetic units 22 of the respective systems perform various instructions per arithmetic cycle of a constant length. The arithmetic units 22 of the respective systems perform the same process in the same order in the same arithmetic cycle.

Then, the arithmetic cycles of the respective systems are adjusted in a way that the starting timings thereof are shifted from each other. In an example illustrated in FIG. 5, the starting timing of the arithmetic cycle of the arithmetic unit 22b is adjusted so as to be slightly delayed with respect to the starting timing of the arithmetic cycle of the arithmetic unit 22a. As a result, the arithmetic units 22 of the respective systems are made to perform the same process in parallel while maintaining a constant time difference. There is a fear that the arithmetic operations by the processors, which are provided to the arithmetic units 22 of the respective systems, may temporarily produce erroneous values due to uncertainty factors, such as a radioactive radiation and the like. However, by shifting the arithmetic cycles like this, the possibility that the uncertainty factors similarly affect the results of operations of the respective systems can be lowered.

Returning to the explanation of FIG. 4, after the other arithmetic unit 22 has been activated, in the first arithmetic cycle, as a step S13, a matching process (tracking) is performed. In the matching process, the processing status of the arithmetic unit 22, which has already started the arithmetic process, is transferred to the other arithmetic unit 22 which is newly activated. As a result, the progressing statuses of the arithmetic processes of the arithmetic units 22 of the respective systems are made to correspond to each other.

After the matching process has been completed like this, the respective arithmetic units 22, as a step S14 and a step S15, are made to respectively perform the arithmetic processes per arithmetic cycles independently. Like this, the matching process is performed at the time of starting, after that, the same process is performed for every arithmetic cycle having a constant length so that the arithmetic units 22 of the respective systems are brought into the states in which the same processes are performed substantially at the same timings while operating independently.

Next, an abnormal event observation between the systems, which operate in the parallel redundant constitution, will be described with reference to FIG. 6. FIG. 6 is a flowchart illustrating the processing procedure of the abnormal event detection process in the majority decision judging device 20a. Note that, the majority decision judging device 20b, and the on-site equipment control devices 40a and 40b also perform the abnormal event observations between the systems by the similar processing procedures in the insides thereof.

As illustrated in FIG. 6, first, as a step S30, the arithmetic unit 22 of the majority decision judging device 20a sets an inconsistency flag, which is a flag showing that an inconsistency of the results of operations continues, to OFF.

Next, as a step S31, the arithmetic unit 22 compares the results of operations between the own system and the other system. Here, the results of operations of the other system are to be sent from the arithmetic unit 22 of the other system by a part of the instructions which are performed in the respective arithmetic cycles.

When the results of operations of both systems correspond to each other (step S32, Yes), the arithmetic unit 22 sets the respective inconsistency flags to OFF, as step S33. Then, when an ending instruction has been issued (step S39, Yes), the arithmetic unit 22 finishes the abnormal event detection process, and otherwise (step S39, No), the step S31 and the following steps are performed again.

On the other hand, when the results of operations of both systems do not correspond to each other (step S32, No), as a step S34, the arithmetic unit 22 judges whether the respective inconsistency flags are OFF, or not. Namely, when an inconsistency of the results of operations has been newly found (step S34, Yes), as a step S35, the arithmetic unit 22 sets the inconsistency flags to ON, and as a step S36, starts a clocking by a timer. Then, when an ending instruction has been issued (step S39, Yes), the arithmetic unit 22 finishes the abnormal event detection process, and otherwise (step S39, No), the step S31 and the following steps are performed again.

When the inconsistency flag is ON, namely, an inconsistency of the results of operations continues (step S34, No), as a step S37, the arithmetic unit 22 judges whether a predetermined time (for example, 30 seconds) has elapsed, or not, from the staring of the clocking. When the predetermined time has not elapsed yet (step S37, No), the arithmetic unit 22 finishes the abnormal event detection process when an ending instruction has been issued (step S39, Yes), and otherwise (step S39, No), performs again the step S31 and the following steps.

On the other hand, when the predetermined time has elapsed, namely, the inconsistency of the results of operations has continued over the predetermined time or more (step 537, Yes), as a step 538, the arithmetic unit 22 gives an alarm about the occurrence of the inconsistency of the results of operations. The alarm here is performed by, for example, turning on an alarm lamp which is disposed in the central control room, or outputting an alarm sound from a speaker which is disposed in the central control room. Then, when an ending instruction has been issued (step S39, Yes), the arithmetic unit 22 finishes the abnormal detection process, and otherwise (step S39, No), performs again the step S31 and the following steps.

Note that, the above-mentioned processing procedures are performed by the arithmetic units 22a and 22b, independently. Moreover, the processes of one loop of the steps S31 to S39 are performed in each arithmetic cycle as a process of an inconsistency between the systems.

Like this, in the majority decision judging device 20a, the arithmetic unit 22a and the arithmetic unit 22b compare their results of operations to each other, and when an inconsistency of the results of operations has continued over the predetermined time or more, the majority decision judging device 20a judges that an abnormal event occurs, and gives an alarm.

The arithmetic unit 22a and the arithmetic unit 22b, which are made to be redundant, operate independently, and therefore, the majority decision judging device 20a seems to normally operate even when a malfunction occurs in one of the arithmetic units 22a and 22b as long as the other operates normally. However, by comparing the results of operations of the arithmetic unit 22a and the arithmetic unit 22b to each other, it becomes possible to detect the fact that a malfunction occurs in one of the arithmetic unit 22a and the arithmetic unit 22b so that the reliability of the majority decision judging device 20a can be enhanced.

Moreover, because the arithmetic cycles of the arithmetic unit 22a and the arithmetic unit 22b are shifted from each other, there is a case that the results of operations of the arithmetic unit 22a and the arithmetic unit 22b become inconsistent temporarily to each other according to the timings of arrivals of the abnormal event detection signals. However, an abnormal event is judged to occur when the inconsistency of the results of operations between the arithmetic unit 22a and the arithmetic unit 22b has continued over the predetermined time or more, thereby capable of correctly judging whether an abnormal event occurs, or not, without being affected by such a temporary inconsistency.

For example, when one of the systems fails to receive a short pulse signal which has been input thereto, the state, in which the signals input into the respective systems are different from each other, may continue over the set time of a timer due to an influence of the timer, such as a delay timer or a one shot timer. In order to prevent a judgment that an inconsistency of the results of operations continue, and an abnormal event occurs, due to such a cause which does not originate the arithmetic unit 22 itself, when a timer is disposed therebetween, it is preferred to have a constitution in which an abnormal event is judged to occur when the time, over which an inconsistency of the results of operations continues, is longer than at least the set time of the timer.

As described above, in the present embodiment, the control device, which is included in the nuclear power plant control system for controlling the safety protection system, is multiplexed, and further the arithmetic unit provided to the control device is multiplexed, so that the respective arithmetic units perform the arithmetic processes independently and in parallel, thereby capable of realizing the nuclear power plant control system which has high reliability.

Note that, the constitution of the nuclear power plant control system described in the above-mentioned embodiment can be voluntarily changed within the scope which does not deviate from the subject matter of the present invention. For example, the level of multiplicity of each part of the nuclear power plant control system described in the above-mentioned embodiment may be voluntarily changed according to the required level of reliability.

Moreover, when the arithmetic unit is multiplexed triply or more, an alarm may be given while specifying the arithmetic unit, in which an abnormal event occurs, based on the number of arithmetic units whose results of operations correspond to each other. For example, when the results of operations of an arithmetic unit A and an arithmetic unit B among the arithmetic units, which are triply multiplexed, correspond to each other, and the result of operation of an arithmetic unit C does not correspond to the others, after this state has continued over a predetermined time, a concerned alarm may be given to the arithmetic unit C which is minority.

Moreover, there may be disposed a mechanism which adjusts the period of changing of the abnormal event detection signal to be input so as to be made longer by the amount of shift of the arithmetic cycle of each system. When the abnormal event detection signal to be input changes with a short period, it is possible to occur that the abnormal event detection signal is reflected in the arithmetic process of the arithmetic units which performs the arithmetic process in advance, whereas the abnormal event detection signal is not reflected in the arithmetic process of the arithmetic unit which performs the arithmetic process with a delay. This situation can be avoided by making the period of changing of the abnormal event detection signal longer by the amount of shift.

Moreover, the nuclear power plant control system described in the above-mentioned embodiment can be used for controlling a system other than the safety protection system, and a plant other than the nuclear power plant.

REFERENCE SIGNS LIST 10a to 10d DETECTION UNIT
20 MAJORITY DECISION JUDGING DEVICE
20a, 20b MAJORITY DECISION JUDGING DEVICE
21 INPUT UNIT
22 ARITHMETIC UNIT
22a, 22b ARITHMETIC UNIT
23 OUTPUT UNIT 40a, 40b ON-SITE EQUIPMENT CONTROL DEVICE
41 INPUT UNIT
42a, 42b ARITHMETIC UNIT
43 OUTPUT UNIT
50 ON-SITE EQUIPMENT

The invention claimed is:

1. A control device which is used in a safety protection system of a nuclear power plant, comprising:
a plurality of arithmetic units which respectively perform arithmetic processes independently and in parallel based on a detection result of a detection unit configured to detect an abnormal event occurring in the nuclear power plant, and output a signal for controlling a handling unit configured to handle the event according to results of operations of the arithmetic processes, wherein
the plurality of arithmetic units perform a matching process for harmonizing process statuses of the arithmetic processes of respective arithmetic units with each other when starting up the control device, and respectively perform the arithmetic processes independently and in parallel after completing the matching process,
in the matching process, when another arithmetic unit of the plurality of arithmetic units is activated after one arithmetic unit of the plurality of arithmetic units has started the arithmetic process, the one arithmetic unit transfers a processing status to the another arithmetic unit in a first arithmetic cycle of the another arithmetic unit to bring both the one arithmetic unit and the another arithmetic unit into a state in which a same arithmetic process is performed at a same timing while respectively operating independently,
the plurality of arithmetic units perform the arithmetic processes per the arithmetic cycles having a predetermined length of an arithmetic cycle, a starting timing of the arithmetic cycles being set so as to be shifted for respective arithmetic units, and
the event detected by the detection unit is input into each of the plurality of arithmetic units after a delay corresponding to an amount of time that the starting timing of the respective arithmetic unit is shifted.

2. The control device according to claim 1, wherein the plurality of arithmetic units compare the results of operations of the arithmetic processes of an own system and another system, and give an alarm when an inconsistency of the results of operations has continued over a predetermined time or more.

3. The control device according to claim 1, wherein the plurality of arithmetic units compare the results of operations of the arithmetic processes of an own system and another system, and give an alarm when an inconsistency of the results of operations has continued over a predetermined time or more, after expiration of an initial preset time.

4. A nuclear power plant control system which controls a safety protection system of a nuclear power plant, comprising:
a detection unit which detects an abnormal event which occurs in the nuclear power plant;
a handling unit which handles the event; and
a plurality of control devices which respectively operate independently, wherein
each of the control devices includes a plurality of arithmetic units which perform arithmetic processes independently and in parallel based on a detection result of the detection unit, and output a signal for controlling the handling unit according to results of operations of the arithmetic processes,
the plurality of arithmetic units perform a matching process for harmonizing process statuses of the arithmetic processes of respective arithmetic units with each other when starting up the control device, and respectively perform the arithmetic processes independently and in parallel after completing the matching process,
in the matching process, when another arithmetic unit of the plurality of arithmetic units is activated after one arithmetic unit of the plurality of arithmetic units has started the arithmetic process, the one arithmetic unit transfers a processing status to the another arithmetic unit in a first arithmetic cycle of the another arithmetic unit to bring both the one arithmetic unit and the another arithmetic unit into a state in which a same process is performed substantially at a same timing while respectively operating independently,
the plurality of arithmetic units perform the arithmetic processes per the arithmetic cycles having a predetermined length of an arithmetic cycle, a starting timing of the arithmetic cycles being set so as to be shifted for respective arithmetic units, and
the event detected by the detection unit is input into each of the plurality of arithmetic units after a delay corresponding to an amount of time that the starting timing of the respective arithmetic unit is shifted.

5. A control method of a safety protection system of a nuclear power plant, comprising:
performing arithmetic processes independently and in parallel by using a plurality of arithmetic units based on a detection result of a detection unit configured to detect an abnormal event occurring in the nuclear power plant, and outputting a signal for controlling a handling unit configured to handle the event according to results of operations of the arithmetic processes, wherein
the plurality of arithmetic units perform a matching process for harmonizing process statuses of the arithmetic processes of respective arithmetic units with each other when starting up the control device, and respectively perform the arithmetic processes independently and in parallel after completing the matching process,
in the matching process, when another arithmetic unit of the plurality of arithmetic units is activated after one arithmetic unit of the plurality of arithmetic units has started the arithmetic process, the one arithmetic unit transfers a processing status to the another arithmetic unit in a first arithmetic cycle of the another arithmetic unit to bring both the one arithmetic unit and the another arithmetic unit into a state in which a same process is performed at a same timing while respectively operating independently,
the plurality of arithmetic units perform the arithmetic processes per the arithmetic cycles having a predetermined length of an arithmetic cycle, a starting timing of the arithmetic cycles being set so as to be shifted for respective arithmetic units, and
the event detected by the detection unit is input into each of the plurality of arithmetic units after a delay corresponding to an amount of time that the starting timing of the respective arithmetic unit is shifted.

6. A control method of a safety protection system of a nuclear power plant, comprising:
detecting an abnormal event which occurs in the nuclear power plant by using a detection unit;
handling the event by using a handling unit;
operating independently by using a plurality of control devices, wherein each of the control devices includes a plurality of arithmetic units which perform arithmetic processes independently and in parallel based on a detection result of the detection unit, and output a signal for controlling the handling unit according to results of operations of the arithmetic processes, the plurality of arithmetic units perform a matching process for harmonizing process statuses of the arithmetic processes of respective arithmetic units with each other when starting up the control device, and respectively perform the arithmetic processes independently and in parallel after completing the matching process, in the matching process, when another arithmetic unit of the plurality of arithmetic units is activated after one arithmetic unit of the plurality of arithmetic units has started the arithmetic process, the one arithmetic unit transfers a processing status to the another arithmetic unit in a first arithmetic cycle of the another arithmetic unit to bring the one arithmetic unit and the another arithmetic unit into a state in which a same process is performed at a same timing while respectively operating independently, the plurality of arithmetic units perform the arithmetic processes per the arithmetic cycles having a predetermined length of an arithmetic cycle, a starting timing of the arithmetic cycles being set so as to be shifted for respective arithmetic units, and the event detected by the detection unit is input into each of the plurality of arithmetic units after a delay corresponding to an amount of time that the starting timing of the respective arithmetic unit is shifted.

\* \* \* \* \*